United States Patent
Villalobos et al.

(10) Patent No.: US 10,626,783 B2
(45) Date of Patent: Apr. 21, 2020

(54) HYBRID CHARGE AIR COOLER

(71) Applicant: Ford Global Technologies, LLC, Dearborn, MI (US)

(72) Inventors: Sergio Villalobos, Mexico City (MX); Gerardo Ramirez Arvizu, Mexico City (MX); Raymundo Garcia, Tlalnepantla (MX)

(73) Assignee: Ford Global Technologies, LLC, Dearborn, MI (US)

( * ) Notice: Subject to any disclaimer, the term of this patent is extended or adjusted under 35 U.S.C. 154(b) by 33 days.

(21) Appl. No.: 15/836,256

(22) Filed: Dec. 8, 2017

(65) Prior Publication Data
US 2019/0178147 A1   Jun. 13, 2019

(51) Int. Cl.
| F01P 3/12 | (2006.01) |
| B60K 11/02 | (2006.01) |
| F01P 7/16 | (2006.01) |
| F02B 29/04 | (2006.01) |
| B60K 13/02 | (2006.01) |

(52) U.S. Cl.
CPC ............... *F01P 3/12* (2013.01); *B60K 11/02* (2013.01); *B60K 13/02* (2013.01); *F01P 7/16* (2013.01); *F02B 29/04* (2013.01); *F01P 2025/30* (2013.01); *F01P 2025/34* (2013.01); *F01P 2050/24* (2013.01); *F01P 2060/12* (2013.01)

(58) Field of Classification Search
CPC .. F01P 3/12; F01P 7/16; F01P 2025/30; F01P 2025/34; F01P 2050/24; F01P 2060/12; B60K 11/02
See application file for complete search history.

(56) References Cited

U.S. PATENT DOCUMENTS

| 3,169,575 A | 2/1965 | Engalitcheff, Jr. et al. |
| 5,482,113 A | 1/1996 | Agonafer et al. |
| 5,875,633 A * | 3/1999 | Lawson, Jr. .......... F01K 23/065 60/618 |
| 2002/0195090 A1 * | 12/2002 | Marsh ..................... F01P 7/165 123/563 |
| 2003/0140636 A1 | 7/2003 | Van Winkle |
| 2005/0061497 A1 | 3/2005 | Amaral et al. |
| 2006/0037590 A1 * | 2/2006 | Uzkan ..................... F01P 7/165 123/563 |
| 2009/0031999 A1 | 2/2009 | Erickson |
| 2014/0150756 A1 * | 6/2014 | Smith .................. F02M 31/205 123/563 |
| 2016/0010576 A1 * | 1/2016 | Primus ................ F02D 41/0052 701/104 |
| 2016/0339760 A1 | 11/2016 | Dunn et al. |
| 2017/0089253 A1 | 3/2017 | Somhorst et al. |
| 2017/0211462 A1 * | 7/2017 | Chen ................... F02B 29/0443 |
| 2018/0334952 A1 * | 11/2018 | Concialdi ........... F02B 29/0456 |

* cited by examiner

*Primary Examiner* — Stephen K Cronin
*Assistant Examiner* — Ruben Picon-Feliciano
(74) *Attorney, Agent, or Firm* — Geoffrey Brumbaugh; McCoy Russell LLP

(57) ABSTRACT

Methods and systems are provided for cooling charge air in a hybrid engine. In one example, a method may include cooling charge air by a combination of air-to-air and air-to-coolant heat transfer with assistance from a chiller arranged in the coolant circuit. The coolant circuit includes an insert coupled to a charge air cooler allowing heat exchange via conduction and convection.

8 Claims, 6 Drawing Sheets

HYBRID CHARGE AIR COOLER

FIELD

The present description relates generally to methods and systems for controlling a vehicle engine to cool boosted air.

BACKGROUND/SUMMARY

By incorporating a turbocharger into an engine of a vehicle, the efficiency and power output of the engine may be improved. Turbochargers may be adapted to a variety of engines types including conventional internal combustion, diesel, and hybrid engines, resulting in the increasing popularity of turbocharged vehicles. By forcibly inducting extra air into a combustion chamber of the engine, a proportional amount of additional fuel is ignited, producing more power than attained via air intake at ambient pressure. The pressurized, or boosted, air is typically heated during compression and if combusted directly, may increase the risk of engine knock. Thus, boosted air is often cooled by flowing the air through a charge-air cooler (CAC) before entering the engine intake manifold, a process that also increases the density of the air.

CACs, in order to effectively cool boosted air, are often large and bulky, resulting in production of vehicles with enlarged front ends compared to non-turbocharged automobiles to accommodate the size of the cooling system. As well, consumer demand has prioritized the development of more fuel-efficient, high performing vehicles which may be partially met by a CAC with smaller dimensions yet greater cooling capacity. Other attempts to address the improvement of current commercially available CACs include the use of water-cooled charge-air coolers (WCAC). One example approach is shown by Somhorst et al. in U.S. Patent Application No. 2017/0089253. Therein, a WCAC with an integrated multi-stage cooling is described that comprises two flow channels adapted to flow two coolants with different temperatures through the WCAC. The disclosed system provided a simpler, smaller device than previous examples of WCACs.

However, the inventors herein have recognized the above situation as well as potential issues with such systems. As one example, WCACs require an additional heat exchanger, driving up the overall cost of the cooling system. As well, WCACs are similarly limited in cooling capabilities as conventional air-to-air CACs and therefore may not experience improvement in performance while adhering to desired configurations.

In one example, the issues described above may be addressed by a method including during first conditions, cooling charge air from a compressor via air-to-air cooling and air-coolant conductive cooling at a hybrid charge air cooler (HCAC), during second conditions, cooling charge air from the compressor via the air-to-air cooling and via air-to-coolant convective cooling at the HCAC, and during third conditions, cooling charge air from the compressor via the air-to-air cooling and via chiller-assisted air-to-coolant convective cooling at the HCAC. In this way, both air-cooling and coolant-cooling may be utilized to exchange heat according to stages of boosted air heating during vehicle operation.

As one example, a HCAC may include an insert through which coolant may be circulated. The coolant may be stagnant during first conditions where heat extraction from the boosted air occurs by conduction to ram air flowing across a surface of the HCAC. During the second conditions, the coolant is allowed to circulate through the insert of the HCAC at ambient temperature, inducing heat transfer from the boosted air via convection in addition to the air-to-air heat exchange by conduction. Heat transfer by conduction and convection is continued through the third conditions but is assisted by additional cooling from a chiller arranged in the cooling circuit. Thus the heat transfer capacity of the HCAC is increased, allowing for a reduction in size of the HCAC unit compared to a conventional CAC without compromising efficiency or adding to manufacturing or operating costs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A-2B are shown approximately to scale.

DETAILED DESCRIPTION

Figure 1:
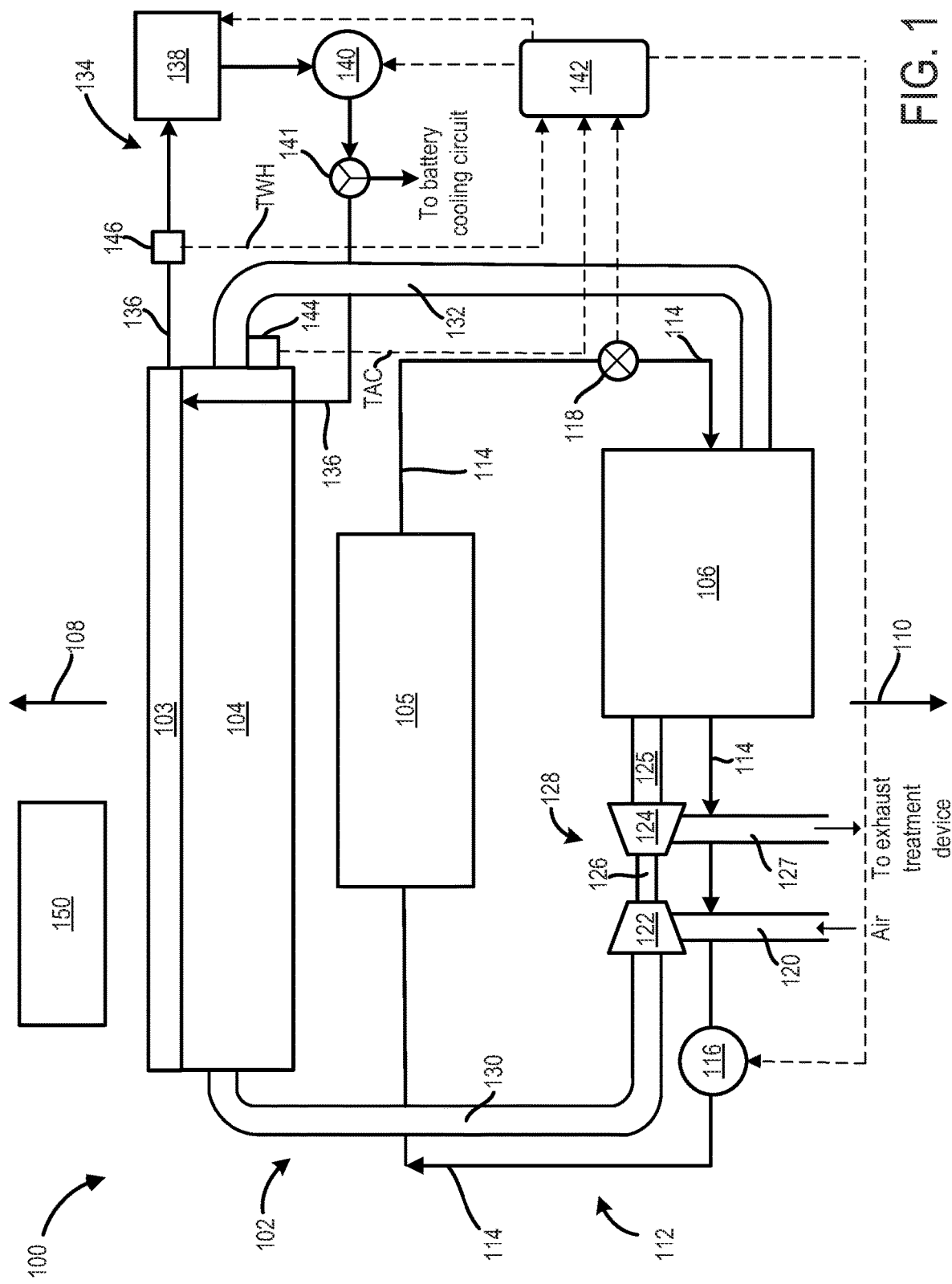
FIG. 1 illustrates a hybrid engine cooling system including a HCAC.
Figure 2A:
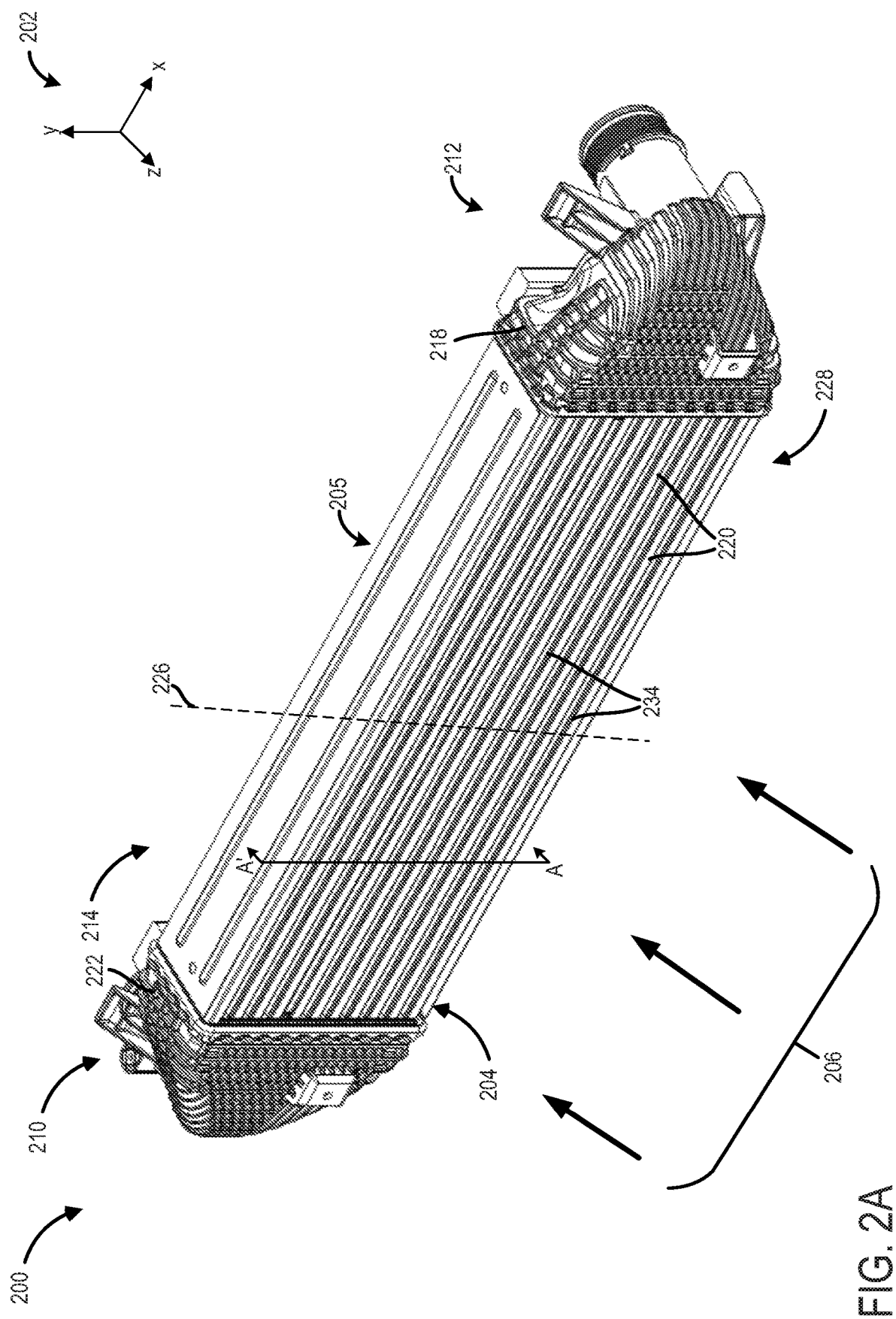
FIG. 2A shows an isometric perspective front view of a first embodiment of a HCAC.
Figure 2B:
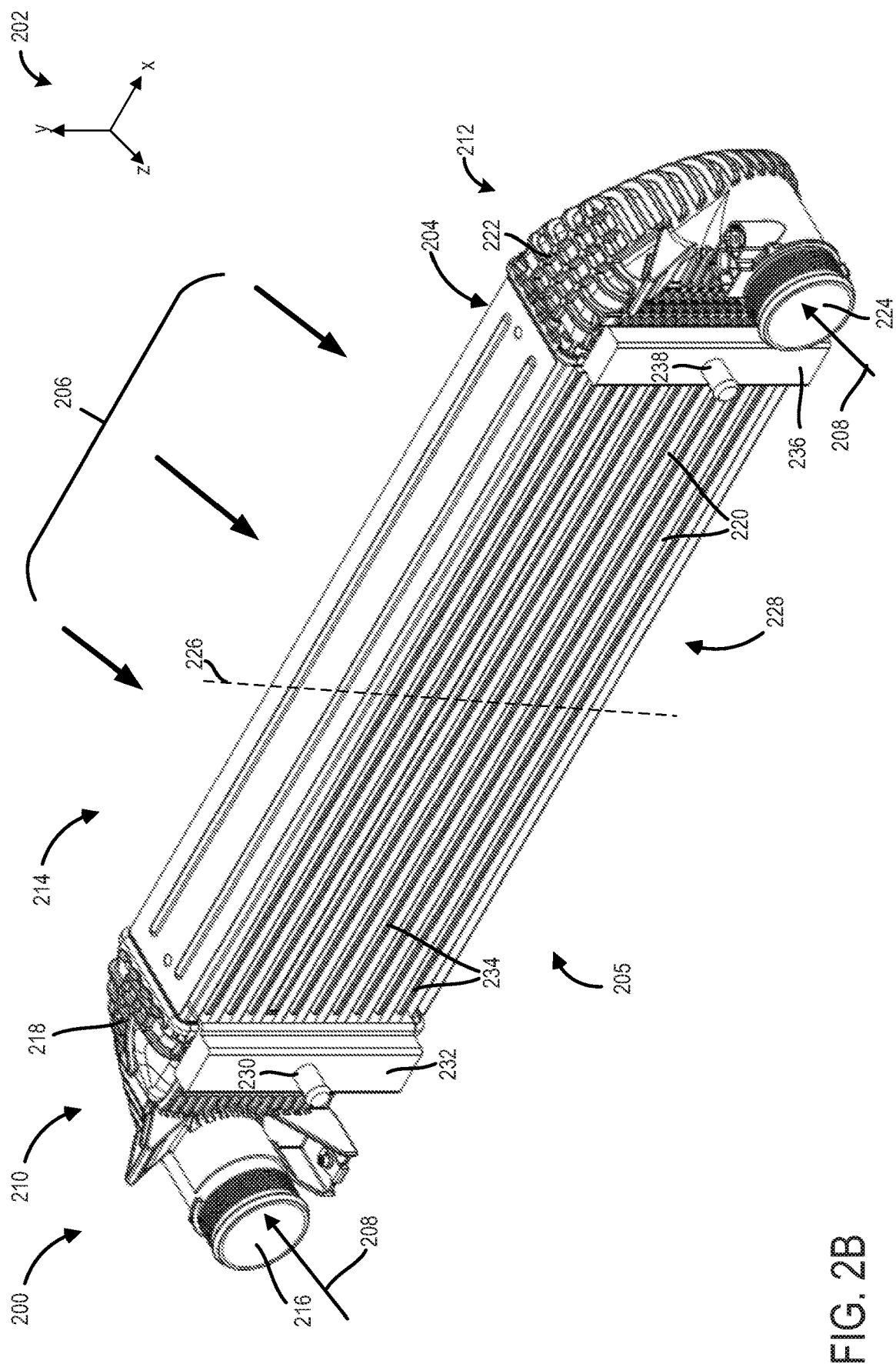
FIG. 2B shows an isometric perspective rear view of a first embodiment of a HCAC.
Figure 4:
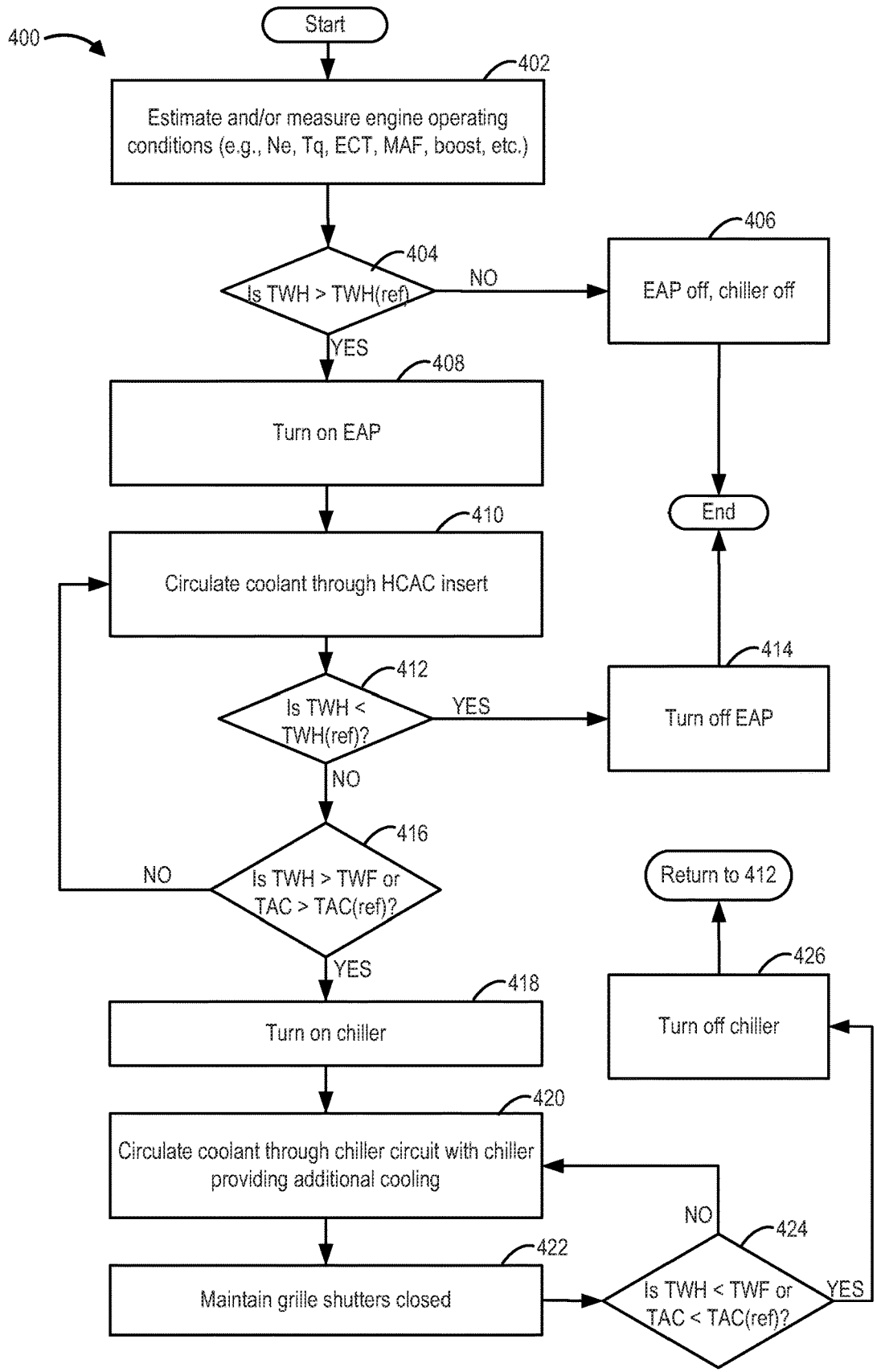
FIG. 4 shows a flow chart illustrating a method for adjusting the cooling capacity of a HCAC according to a temperature of the boosted air.
Figure 5:
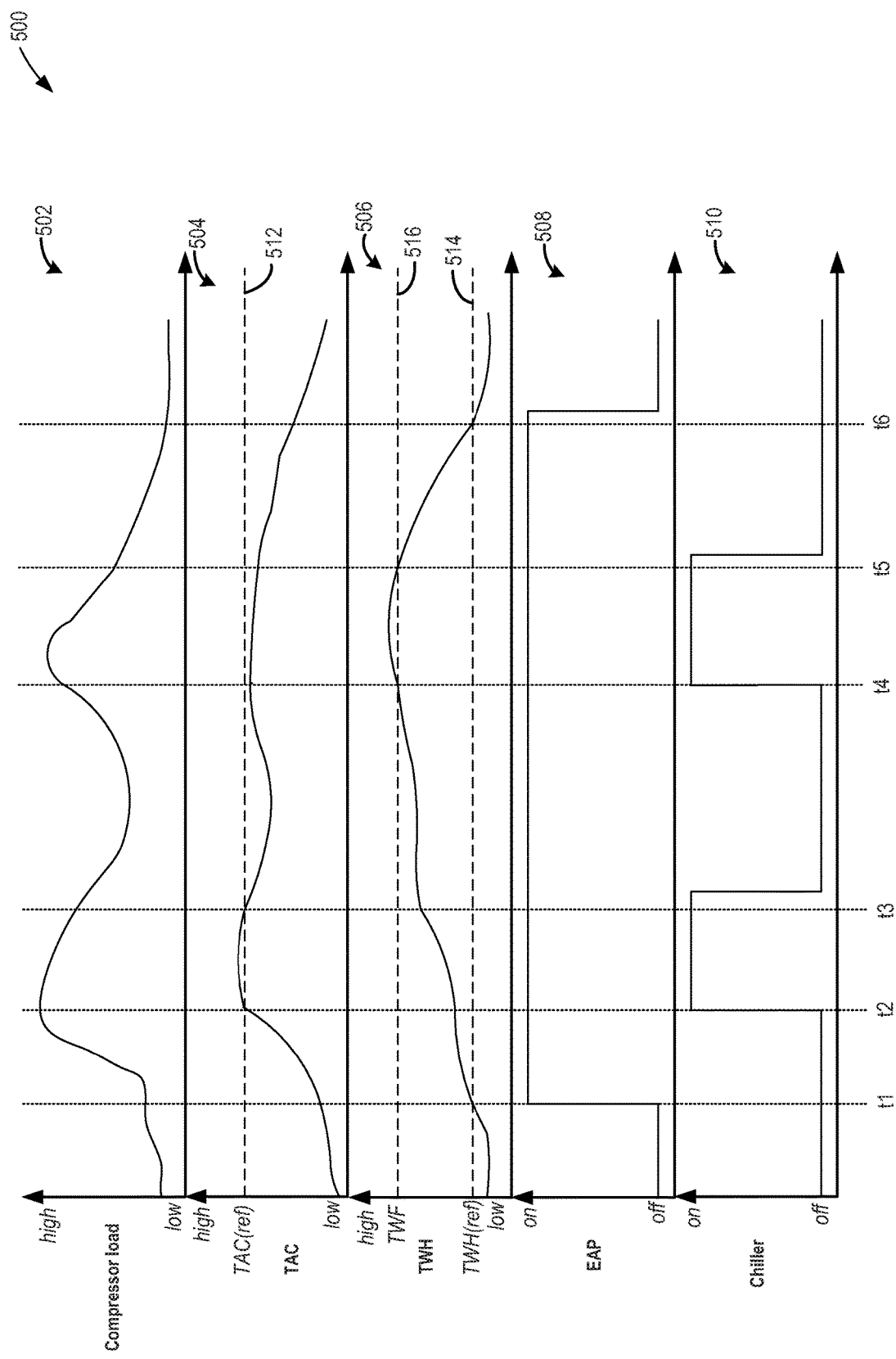
FIG. 5 illustrates an example operation map of a cooling system including a HCAC.

The following description relates to systems and methods for adjusting the efficiency of a hybrid charge-air cooler (HCAC) cooling system for cooling boosted air. The HCAC cooling system may be included in an electric or hybrid electric vehicle system coupled to an engine as illustrated in FIG. 1 and arranged in front of a radiator within a front end of the vehicle. The HCAC utilizes both air-cooling and coolant-cooling to treat hot boosted air by enabling air-to-air heat exchange across a surface area of the HCAC during initial stages of engine operation, followed by coolant-assisted cooling at higher temperatures. As the engine load increases so that the coolant temperature rises above a predetermined threshold, increased cooling is effected by activating a chiller included in a HCAC cooling circuit to further cool the coolant. The HCAC may comprise an insert, as shown in FIGS. 2A-2B, through which coolant may be flowed, enabling greater cooling efficiency without additional parts that add to the size and bulk of the HCAC as compared to a conventional air-cooled CAC (ACAC). The HCAC is viewed from the front in FIG. 2A and from the rear in FIG. 2B. An arrangement of the insert relative to channels of the HCAC is shown in further details in a cross-section of the HCAC of FIG. 3. The cooling system is adjusted relative to a temperature of the boosted air or coolant downstream of the HCAC according to a method shown in FIG. 4. FIG. 5 shows an example of an operational timeline while cooling air boosted by a turbocharger during vehicle operation.

A cooling system for lowering the temperature of boosted air before the air is delivered to the engine often includes a CAC. Conventional ACACs rely on heat exchange between boosted air inside the CAC and ambient air flowing across a surface area of the CAC. Thus a larger surface area enables enhanced cooling by the CAC but limits on the size of the CAC may be imposed as based on available space in the engine compartment of a vehicle. The CAC may be positioned between a main radiator of an engine and a grille reinforcement system and coupled with an active grille shutter (AGS) system and condenser. Without increasing the front end size of the vehicle, the height and thickness of the CAC may affect the availability of space for other vehicle and engine components. The alternative use of WCACs, which are often thinner than ACACs, may provide more space in front of the main radiator but often has the caveat of incorporating an additional heat exchanger in order to meet the cooling demands of the WCAC. The heat absorbed by coolant that is circulated through the WCAC is transferred to the heat exchanger in order to increase of the cooling capacity provided by the coolant. However, the inclusion of a second heat exchanger in the cooling system may increase costs and space requirements. These issues may be alleviated by the use of a HCAC adapted with a separate chiller-assisted cooling path. The chiller-assisted cooling path may be readily coupled to a chiller used in electric and hybrid electric vehicles to cool down a battery circuit, eliminating the need for a second heat exchanger in the cooling path. The incorporation of the chiller-assisted cooling path into an engine system may impose minimal interference on battery performance due to the activation of the chiller for battery cooling being constrained to high electrical heat rejection demands. A conventional ACAC may be configured as a HCAC by pairing the ACAC with an insert that enables coolant flow across a surface of the HCAC. The improved cooling capacity of the HCAC may allow the size of the unit to be reduced without degrading the performance of the HCAC.

An example of a boosted air cooling path 102 comprising a HCAC 104 coupled to an engine block 106 of a vehicle is illustrated in the block diagram 100 of FIG. 1. The vehicle may be an electric or hybrid electric vehicle that drives the vehicle with only electric power from one or more electric motors during at least some vehicle traveling conditions. The electric motor is powered by a battery pack that is configured to store an electrical charge that may also power other vehicle components. During charging events, the battery pack may generate a significant amount of heat that may degrade the performance and lifetime of the battery pack. Heat production may be managed by cooling the battery pack with a cooling circuit that circulates a fluid that extracts heat from the battery pack and exchanges heat with a chiller coupled to the cooling circuit.

The coolant system described herein for the engine may operate while the engine operates as well as when the engine is stopped and deactivated to cool the engine during electric driving conditions, in one example. The elements shown in block diagram 100 may be contained within a front end compartment of the vehicle. An arrow 108 indicates a direction towards a front of the vehicle and an arrow 110 indicates a direction towards a rear of the vehicle. Block diagram 100 includes an engine cooling loop 112 that may flow a first coolant, e.g., radiator fluid, through a coolant jacket of engine block 106 via radiator hoses, represented by solid arrows 114. The first coolant flow is directed through the engine cooling loop 112 by a first pump 116 and a temperature of the first coolant may be monitored by a thermostat 118. The direction of flow may be used to describe the positioning of elements with respect to one another. An element in the path of a reference point may be referred to as downstream of the reference point. Conversely, an element before a reference point in the path of flow may be described as upstream of the said reference point.

The engine cooling loop 112 is configured to cycle fluid through the radiator 105 arranged towards the front of a front end of the vehicle to derive maximum cooling assistance from ram air across a surface area of the radiator 105. The first coolant is flowed to a stationary component, e.g., the engine block 106, to transfer heat away from the engine block 106 via a fluid with a higher heat capacity than the material forming the engine block 106. An opposite principle of operation is implemented in the boosted air cooling path 102. Therein, the object of cooling is pressurized air which is flowed through the circuit to be cooled at a stationary cooling device, e.g., the HCAC 104.

Ambient air may enter the boosted air cooling path 102 at an intake passage 120. The air is drawn into a compressor 122 of a turbocharger 128. The turbocharger 128 may provide boosted air charge to the engine block 106 arranged at a downstream end of the boosted air cooling path 102. The rotation of the compressor 122 may be driven by an exhaust turbine 124 of the turbocharger 128, connected to the compressor 122 by a shaft 126. The turbine 124 may receive exhaust gas from cylinders of the engine block 106 via exhaust passage 125. The rapid expansion of hot exhaust gas compels the rotation of the turbine 124. The spent exhaust gas is then channeled to an after treatment device, such as a catalytic converter, through exhaust path 127. In other examples of a system for providing boosted air, the turbine 124 may be electrically driven or boosted air may be delivered by a supercharger in place of the turbocharger 128.

The air exiting the compressor 122 may experience an increase in temperature due to compression. The warm temperature of the boosted air may result in reduced fuel efficiency as well as higher likelihood of engine knock. To circumvent such issues, the boosted air is passed through a heat exchanger, such as the HCAC 104, to reduce the temperature of the boosted air and increase the density of the boosted air, thereby improving combustion efficiency. The HCAC 104 is positioned downstream of turbocharger 128 and upstream of engine block 106. The boosted air flows from compressor 122 towards the front of the vehicle, indicated by arrow 108, through a first passage 130 of the boosted air cooling path 102 to an inlet end of the HCAC 104. Upon passing through the HCAC 104, the boosted air becomes cooled and denser. The boosted air leaves the HCAC 104 at an outlet end and may enter a second passage 132 of the boosted air cooling path 102 and is further flowed to the engine block 106 for ignition in combination with fuel.

Active grille shutters (AGS) 150 may be arranged in front of the HCAC 104. Ambient airflow from outside the vehicle may enter an engine compartment in the vehicle front end through the AGS 150 and pass across the HCAC 104, to aid in cooling the boosted air. A percentage opening of the AGS 150 may be adjusted based on engine operating conditions in order to increase or decrease cooling airflow to the engine compartment. Specifically, an engine controller 142 may command an active grille shutter position via a motor coupled to the AGS 150 (not shown in FIG. 1). The motor may then adjust the AGS 150 into the commanded position.

The HCAC 104 is positioned in front of the radiator 105, with respect to the front end of the vehicle, to obtain maximum ambient cooling from ram air during vehicle navigation. By minimizing the dimensions of the HCAC 104, without sacrificing cooling efficiency, more space within the front end compartment of the vehicle may be made available for access to engine components. Additionally, decreasing the size of the HCAC 104 may allow additional elements to be added to the front end compartment without enlarging the front of the vehicle to compensate. The efficiency of the HCAC 104 may be increased by configuring the HCAC 104 with an insert 103 and coupling a chiller circuit 134 to the HCAC 104 that flows a second coolant, such as ethylene glycol, through the insert 103. In this way, the HCAC 104 is a merging point of the boosted air cooling path 102 and the chiller circuit 134. More heat may be extracted from the boosted air by additional cooling provided by the chiller circuit 134 than by heat exchange with ram air or the second coolant circulating at ambient temperature.

The chiller circuit 134 includes hoses, represented by arrows 136, directing the second coolant through a chiller 138 and a second pump 140 which may be an electric auxiliary pump (EAP) 140. In one example, the chiller may be a device that removes heat from a liquid by either vapor-compression or absorption refrigeration via a low boiling point refrigerant, such as an HCFC for the former and ammonia or water for the latter system. When the EAP 140 is on, coolant is continually cycled through the chiller 138. However, heat transfer from the coolant to the chiller 138, e.g., heat absorption to drive the vapor-compression cycle or absorption refrigeration cycle of the refrigerant, does not occur until the chiller 138 is activated (switched on). In another example, the chiller may be a thermoelectric cooler configured to cool the coolant circulating through the chiller responsive to current flowing through the thermoelectric cooler. Activation of the chiller (e.g., supplying current to the thermoelectric cooler) may be governed by the controller 142 sending commands based on input that is described in detail further below. The chiller 138 may be a component in the battery coolant circuit described above in the electric or hybrid-electric vehicle that is controlled by a powertrain control module. The chiller circuit 134 may merge with the battery coolant circuit at a three-way valve 141 positioned downstream of the EAP 140.

The three-way valve 141 may have an inlet into which the second coolant flows and a first outlet and a second outlet, the first outlet fluidly coupling the EAP 140 to the insert 103 of the HCAC 104 and the second outlet fluidly coupling the EAP 140 to the battery coolant circuit. The controller 142 may command an opening and closing of the first and second outlets in response to a desired amount of cooling for the battery pack and/or the boosted air. In one example, three-way valve 141 may be adjusted to open the second outlet and close the first outlet to direct maximum coolant flow to the battery pack if it is determined that a temperature of the battery pack has increased beyond a predetermined threshold. As a second example, the first outlet may be opened and the second outlet closed if the boosted air is not cooled to a pre-set temperature threshold and the thermal management of the battery pack is not desired. In another example, the first outlet may be maintained closed with the coolant flow channeled to the battery pack until chiller-assisted cooling of the insert 103 is indicated. The three-way valve 141 may be adjusted to open the first outlet with the second outlet also open to split the flow of the second coolant between the chiller circuit 134 and the battery coolant circuit.

The insert 103 of the HCAC 104 is also a component in the chiller circuit 134, positioned downstream of the EAP 140 and upstream of the chiller 138. The EAP 140 drives the flow of the second coolant through the chiller circuit 134 and may be switched on or off based on a temperature of the second coolant leaving the insert 103 or the boosted air exiting the HCAC 104. The activation of the chiller circuit 134 may be determined by the controller 142 receiving data from a plurality of sensors arranged along the boosted air cooling path 102 and the chiller circuit 134.

The controller 142 may be a microcomputer that, in addition to receiving data, may store information such as temperature thresholds, compressor operating maps, look-up tables, etc. The controller 142 may also be a messenger to relay signals between elements shown in FIG. 1. For example, engine cooling loop 112 may be configured so that the controller 142 receives input from the thermostat 118. The thermostat 118 may be a temperature-regulated valve adapted to remain closed and block the first coolant flow, indicated by solid arrows 114, during initial vehicle start-up to allow the engine block 106 to warm-up. When the first coolant is detected to surpass a temperature threshold which may be pre-set by a manufacturer, the thermostat 118 may open. The controller 142 may receive a signal that the thermostat 118 is actuated to an open position and proceed to turn on the first pump 116 to circulate the first coolant and lower the temperature of the engine block 106.

Similar processes may be adapted to the boosted air cooling path 102 and chiller circuit 134. The boosted air cooling path 102 may include a first temperature sensor 144 positioned at an outlet end of the HCAC 104 to monitor a temperature of the cooled boosted air leaving the HCAC 104 (e.g., the temperature of the air charge at the HCAC outlet, also referred to as TAC). The chiller circuit 134 may also have a second temperature sensor 146 arranged in the path of the second coolant flow from the HCAC 104 to the chiller 138, downstream of the HCAC 104 and upstream of the chiller 138, that monitors a temperature of the second coolant after flowing through the insert 103 of the HCAC 104 (e.g., the temperature of the water at the HCAC outlet, also referred to as the TWH). The controller 142 may use information about the current temperatures sent from the first temperature sensor 144 and the second temperature sensor 146 to compare against pre-set temperature thresholds. The EAP 140 and the chiller 138 may be instructed to turn on or off based on the comparison of the current temperatures to the temperature thresholds.

For example, during an early period of vehicle operation subsequent to engine ignition and initial spooling of the turbocharger (e.g., during an engine cold start), the EAP 140 and the chiller 138 are turned off. The second coolant in the chiller circuit 134 is stationary and at ambient temperature. While the boosted air may experience small increases in temperature during compression, conventional cooling via air-to-air heat exchange cools the boosted air as it flows through the HCAC 104. The temperature of the boosted air at the HCAC outlet is affected by the temperature of the second coolant exiting the insert 103 by heat conduction from the warmed boosted air to the coolant as the boosted air flows through the HCAC 104. A flow of ram air across the HCAC 104 is sufficient to cool the boosted air so that heat exchange between the boosted air and coolant maintains the coolant temperature below a threshold temperature (TWH (ref)) of the second coolant leaving the insert 103, that is determined by a manufacturer and stored in a memory of the controller 142. In one example the TWH(ref) may be 25° C. but other examples may include the TWH(ref) set at 20° C. or 30° C., depending on tolerances of the HCAC 104 or of a combustion system of the engine block 106. After a period of driving elapses the turbocharger may be spooled up and compress the boosted air so that the air is warmed more than during the initial vehicle start-up. Air-to-air heat exchange through the HCAC 104 may not sustain the coolant temperature below the TWH(ref).

Upon detection of the second coolant temperature at or exceeding the temperature threshold (TWH(ref)), the controller may command the EAP 140 to turn on. An increased cooling of the boosted air is enabled via convection as the second coolant flows through the insert 103 of the HCAC 104. However, higher engine loads, such as loads exhibited during trailer towing or increased vehicle speed, may lead to high compressor loads and result in warming of the boosted air so that the temperature of the second coolant exiting the insert 103 continues to rise. The second temperature sensor 146 may eventually detect the second coolant temperature to be higher than a maximum allowable coolant temperature (TWF), also stored in the memory of the controller 142. In one example, the TWF may be 49° C. In other examples the TWF may be 40° C. or 55° C., or a value greater than 25° C. that may depend on the tolerance or efficiency of the HCAC 104 as according to the manufacturer. Alternatively, the temperature of the boosted air at the HCAC outlet may reach or surpass a temperature threshold, hereafter referred to as a TAC(ref). The TAC(ref) may be a value set by the manufacturer or a value based on a calculated relationship between the maximum allowable coolant temperature (TWF) and temperature of the boosted air charge (TAC) according to expected heat exchange through the materials from which the HCAC 104 and the insert 103 are formed. The TAC(ref) may be similar to the TWF or 5-20° C. higher than the TWF(ref) due to the higher heat capacity of fluids versus air.

If the controller 142 determines that the temperature of the second coolant exiting the insert 103 exceeds the maximum allowable coolant temperature or the temperature of the boosted air exceeds the temperature threshold of the cooled boosted air, the chiller 138 is activated. In an example, the controller 142 may activate the chiller responsive to at least one of the TWH or TAC being greater than the respective threshold (TWF or TAC(ref), respectively). In another example, the controller 142 may activate the chiller responsive to both the TWH and TAC being greater than the respective thresholds (TWF and TAC(ref), respectively).

The second coolant flowing through the chiller circuit 134 is additionally cooled by the chiller 138, offsetting the elevated boosted air temperature imposed by compressor operation under high loads and/or high torque demands. In this way, a boosted engine may perform with improved power output and fuel efficiency by coupling a pathway of boosted air flow provided by the turbocharger with the HCAC 104 that is both air-cooled and coolant-cooled. During initial driving stages and low compressor loads, boosted air is sufficiently cooled by heat exchange with ram air and conduction through the second coolant at ambient temperature where the second coolant temperature and boosted air temperature is less than 25° C.). As the compressor 122 spools up and the boosted air temperature is detected to rise above 25° C., the EAP 140 is turned on, flowing the second coolant through the insert 103. Further cooling of the boosted air is enabled when the second coolant temperature exceeds 49° C. and the chiller 138 is actuated.

By restricting the activation of the EAP 140 and the chiller 138 to temperatures above a threshold, energy expenditure towards the operation of these components may be minimized. Furthermore, the three-stage cooling process of the HCAC 104 may enable boosted air to be cooled without the use of a CAC fan, thereby freeing space in the vehicle front end. In addition, CACs are often coupled with an active grille shutter (AGS) to regulate air flow to the CAC. When the AGS is open to allow air flow across a heat exchanger, such as the HCAC 104 or the radiator 105, drag is generated, reducing the fuel efficiency of the vehicle. The HCAC 104 may enable efficient cooling of boosted air while maintaining the AGS closed. Finally, the HCAC 104 dimensions may be decreased relative to a conventional air-to-air charge-air cooler which may mitigate condensation issues on the HCAC 104 without compromising performance.

In order to utilize both air-cooling and water-cooling (or other types of coolant), a HCAC may comprise a conventional air-to-air (ACAC) configuration adapted with elements allowing coolant to flow across a surface of the HCAC to enhance the heat-exchange capability of the HCAC. An embodiment of an HCAC 200, which may be an example of the HCAC 104 of FIG. 1, is illustrated in FIGS. 2A-2B. A set of reference axes 202 is provided, showing the "x" horizontal direction, "y" vertical direction, and "z" lateral direction. A direction of flow of ram air (ambient air flow created by movement of an object, herein the vehicle) across a front surface 204 of the HCAC 200 is indicated by arrows 206. A direction of boosted air flow through the HCAC 200 is represented by arrows 208 as shown in FIG. 2B. For example, air warmed as a result of compression by a compressor, such as the compressor 122 of FIG. 1, may enter the HCAC 200 at an inlet end 210, flow through a body 214 of the HCAC 200 from the inlet end 210 to an outlet end 212 and exit the HCAC 200 at the outlet end 212. A width of the body 214, equal to the width of the front surface 204 as defined along the horizontal direction, separates the inlet end 210 from the outlet end 212. The inlet end 210 may also be referred to as a hot end 210 and the outlet end 212 may be referred to as a cold end 212 of the HCAC 200.

The inlet end 210 of the HCAC 200 may include an inlet passage 216 that may be coupled to an air passage flowing boosted air from a turbocharger such as the first passage 130 of the boosted air cooling path 102 of FIG. 1. Warm air entering inlet passage 216 flows into an inlet reservoir 218 before travelling through heat exchange channels 220 arranged coaxial with the horizontal direction and evenly spaced apart. The heat exchange channels 220 and the body of the HCAC 200 may be formed from a lightweight material with high heat conductivity, such as aluminum, to allow transfer of heat from the warmed boosted air entering the HCAC 200 to ram air contacting the front surface 204. The configuration of the long narrow horizontal passages of the heat exchange channels 220 provides a high surface area relative to volume of the heat exchange channels 220 to maximize the cooling effect of ram air flow.

The cooled boosted air is directed into an outlet reservoir 222 of the HCAC 200 before exiting via an outlet passage 224. The outlet passage 224 may be coupled to an air passage such as the second passage 132 of the boosted air cooling path 102 that delivers cooled boosted air to the engine block 106 with reference to FIG. 1. As shown in FIG. 2A-2B, the HCAC 200 may be mirror-symmetric about a bisecting line 226. In other examples, the HCAC 200 may be asymmetric with a different arrangement of the outlet end 212 relative to inlet end 210. As well, the HCAC 200 may have more or fewer of the heat exchange channels 220 than shown in FIGS. 2A-2B or may vary in alignment or dimensions of the heat exchange channels 220.

As described above, the HCAC 200 may function as an ACAC when a temperature of a coolant contained within a chiller circuit coupled to a boosted air cooling path, with reference to the chiller circuit and boosted air cooling path of FIG. 1, is below a threshold value (e.g. a TWH(ref)), such as 25° C.). When the temperature of the coolant rises above the TWH(ref), the HCAC 200 may be adapted to function as a WCAC by flowing the coolant, e.g. water or ethylene glycol, through the insert 228 arranged between the heat exchange channels 220 of the HCAC 200. The insert 228 comprises a coolant inlet 230, shown in FIG. 2B, adjacent to and downstream of the inlet end 210 of the HCAC 200 that may be attached to a first coolant tank 232. The coolant inlet 230 may be coupled to a hose of the chiller circuit. The first coolant tank 232 may be rectangular in shape with a height, defined in the vertical direction, similar to a height of the HCAC 200 and a width, defined in the horizontal direction, that is shorter than the height. The first coolant tank 232 may be fluidly coupled to an upstream end of a plurality of cooling tubes 234. The plurality of cooling tubes 234 may be arranged along the horizontal direction, extending across the entire width of the body 214 of the HCAC 200. The plurality of cooling tubes 234 may be formed from a lightweight, heat conducting material such as aluminum that is also resistant to chemical degradation from the coolant flowing therethrough.

A thickness, measured along the vertical direction, of each of the plurality of cooling tubes 234 may be configured to fit in the spaces between each of the heat exchange channels 220. Thus the front surface 204 shown in FIG. 2A of the HCAC 200 may comprise an alternating pattern of cooling tubes 234 and heat exchange channels 220, with each one of the plurality of cooling tubes 234 disposed in between two of the heat exchange channels 220. Each of the plurality of cooling tubes 234 is in contact with one of the heat exchange channels 220 arranged below and spaced away from one of the heat exchange channels 220 arranged above. A rear surface 205 of the HCAC 200, as shown in FIG. 2B, may have a similar configuration of the plurality of cooling tubes 234 and the heat exchange channels 220. In other words, each of the heat exchange channels 220 may be in face-sharing contact with one of the plurality of cooling tubes 234 positioned so that a bottom face of the plurality of cooling tubes 234 is flush with a top face of the heat exchange channels 220. A more detailed view of the arrangement of the cooling tubes 234 and heat exchange channels 220 is provided in FIG. 3 and described below. In this way, heat from the boosted air flowing across the HCAC 200 through the heat exchange channels 220 may be transferred through a surface of each of the heat exchange channels 220 to ram air and also through a surface of the plurality of cooling tubes 234 to the coolant flowing through the insert 228.

The cooling tubes 234 may be fluidly coupled at a downstream end to a second coolant tank 236 that is positioned upstream of and adjacent to the outlet end 212 of the HCAC 200. The second coolant tank 236 may be similar in dimensions as the first coolant tank 236 and include a coolant outlet 238. The coolant outlet 238 may be coupled to a hose of the chiller circuit, enabling circulation of coolant through a closed circuit with a chiller, e.g., the chiller 138 of FIG. 1, included in the circuit to continually extract heat from the coolant when activated. In this way, when an EAP, such as the EAP 140 of FIG. 1, in the chiller circuit is turned on, the coolant circulates at ambient temperature through the insert 228 from the coolant inlet 230 to the coolant outlet 238 via the plurality of cooling tubes 234. Heat may be exchanged between the boosted air in the heat exchange channels 220 and the coolant in the plurality of cooling tubes 234, as well as with ram air, via conduction across the surfaces of the heat exchange channels 220 and the plurality of cooling tubes 234. Further heat transfer from the boosted air to the coolant is transmitted by convection arising from coolant flow. The chiller may be activated when the warming of the boosted air is increased due to increased compressor load, resulting in additional heat exchange between the coolant and cooling elements of the chiller, thus lowering the temperature of the coolant and enabling enhanced heat extraction from the boosted air.

The additional cooling by the chiller may be provided by the arrangement of the insert 228 between the heat exchange channels 220 of the HCAC 200 so that a surface of the heat exchange channels 220 is in contact with the plurality of cooling tubes 234 of the insert 228. The contact between the heat exchange channels 220 and the cooling tubes 234 is illustrated in a cross-section 300 of the insert 228 and HCAC 200 of FIG. 3. The cross-section 300 is taken across line A-A' (e.g., from the plane formed by the vertical direction and lateral direction and viewed from the right side of the HCAC 200) of FIG. 2A. Elements common to FIG. 2 are similarly numbered.

Figure 3:
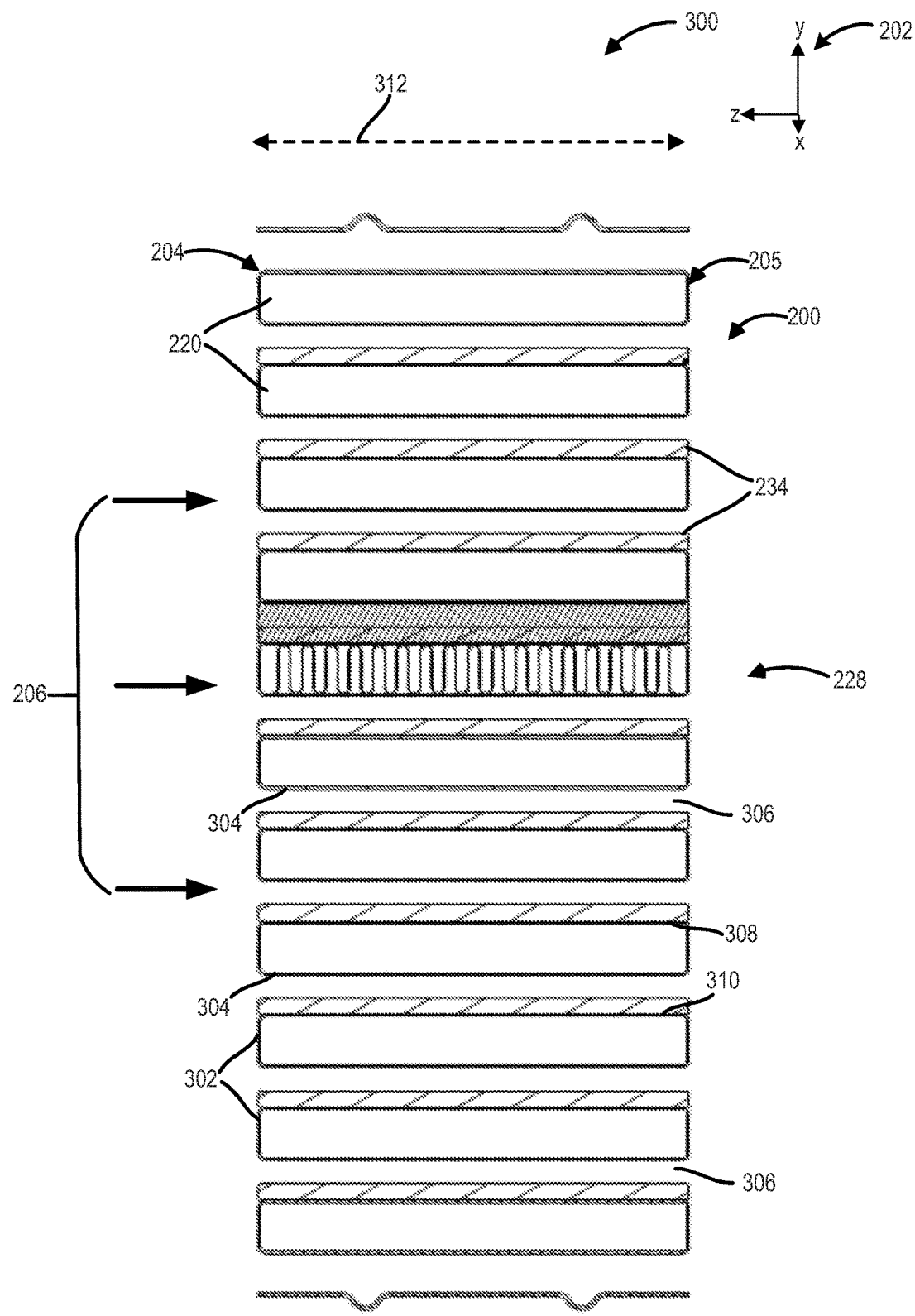
FIG. 3 shows a cross-section of a second embodiment of a HCAC.

As shown in FIG. 3, the cross-section 300 of the heat exchange channels 220 of the HCAC 200 may be rectangular and elongated along the lateral direction. Ram air, as indicated by arrows 206, may flow across the front surface 204 of the HCAC 200 that comprises front surfaces 302 of the heat exchange channels 220, as well as flowing across bottom surfaces 304 of the heat exchange channels 220 through gaps 306, providing air-to-air cooling of the boosted air flowing therein. The heat exchange channels 220 may be evenly spaced apart with each of the plurality of cooling tubes 234 of the insert 228 disposed between the heat exchange channels 220.

Each cooling tube of the plurality of cooling tubes 234 may have a rectangular cross-section with a width 312, defined along the lateral direction, that is equal to a width of the heat exchange channels 220. The plurality of cooling tubes 234 may also extend along an entire length, defined along the horizontal direction, of the heat exchange channels 220. In other examples of the HCAC 200, the plurality of cooling tubes 234 may extend along a portion, such as 50% or 75%, of the length of the heat exchange channels 220. A bottom face 308 of each of the plurality of cooling tubes 234 may share a surface with a top surface 310 of each of the heat exchange channels 220, thus the plurality of cooling tubes 234 are in face-sharing contact with the heat exchange channels 220. Heat transfer occurs across the shared surface of the plurality of cooling tubes 234, containing coolant, and the heat exchange channels 220, containing warmed boosted air.

An example method 400 for cooling boosted air supplied to an engine is described below. A HCAC, such as the HCAC 200 of FIG. 2, may be included in a chiller circuit coupled to a boosted air cooling path of an engine, as shown in FIG. 1, to allow a 3-stage cooling process of warmed boosted air to reduce a temperature of boosted air supplied to an engine. By cooling the boosted air via a combination of air-to-air heat exchange, air-to-coolant heat exchange, and chiller assisted cooling, a power output and fuel economy of the engine may be improved. Instructions for carrying out method 400 and the rest of the methods included herein may be executed by a controller based on instructions stored on a memory of the controller and in conjunction with signals received from sensors of the engine system, such as the sensors described above to with reference to FIG. 1. The controller may employ engine actuators of the engine system to adjust engine operation according to the methods described below.

At 402, the operating conditions of the engine may be estimated and/or measured. These may include, for example, engine speed and load, torque demand, engine coolant temperature, a temperature of a coolant exiting an insert of the HCAC (TWH), a temperature of the cooled, boosted air (TAC), boost pressure, etc. At 404, it may be determined if the TWH is greater than threshold temperature of the coolant exiting the insert (TWH(ref)). Determining the TWH may be based on the controller receiving signals from a temperature sensor positioned downstream of the HCAC and upstream of the chiller in the cooling loop, such as the second temperature sensor 146 of FIG. 1. The TWH(ref) may be a threshold set by a manufacturer that is based on an estimated amount of heat transfer to the coolant from the boosted air. The temperature at which the TWH(ref) is set may be based on a temperature range at which the boosted air is sufficiently cooled to provide a desired performance by the engine. If the TWH is not greater than the TWH(ref), the method proceeds to 406, turning or maintaining the EAP and chiller off. Due to the temperature of the coolant at the insert outlet being below the threshold temperature, additional cooling at the HCAC via coolant circulation and/or chiller assistance is not indicated. If the TWH is detected to exceed the TWH(ref), the routine may activate the EAP to turn on at 408 (or maintain the EAP activated). Additionally, the actuation of the EAP to an on position may include detection of the TWH at the TWH(ref) within a threshold of the TWH(ref). For example, the EAP may be turned on when the TWH is within 1-5° C. below the TWH(ref). Thus, when the coolant in the insert is below a first threshold temperature, the charge air in the HCAC may be cooled via ram air and via conduction with the stagnant coolant in the insert. When the coolant in the insert increases to or above the threshold temperature, the EAP is activated to commence circulation of coolant through the insert, and the charge air in the HCAC may be cooled via the ram air and via convection with the circulating coolant.

When the EAP is turned on, coolant is circulated through the chiller circuit at ambient temperature, flowing through the insert arranged across a surface of the HCAC, as indicated at 410 of the method. At 412, the temperature of the coolant exiting the insert (TWH) is compared again to the threshold temperature of the coolant exiting the insert (TWH(ref)) to determine if the TWH is reduced to below the TWH(ref) by circulating the coolant at ambient temperature. If the TWH is determined to be below the TWH(ref), the coolant, and thus boosted air, is deemed sufficiently cooled and the EAP is turned off at 414, thereby conserving energy otherwise consumed by operation of the EAP. In some examples, the EAP may be turned off responsive to the TWH falling to a temperature that is below the TWH(ref) but within a threshold range of the TWH(ref), such as 1-5° C. below the TWH(ref), to avoid repeated turning on and off the EAP as the TWH hovers around the TWH(ref). Alternatively, a control algorithm may be applied during events where the TWH may be fluctuating at the TWH(ref) to minimize repetitive switching on and off of the EAP.

If the THW is not below the TWH(ref), e.g., at or exceeding the TWH(ref), the method proceeds to 416 to query whether the TWH is greater than a maximum allowable temperature (TWF) of the coolant exiting the insert (explained further below). If the TWH is not greater than the TWF, or, alternatively, if a temperature of the boosted air at the HCAC outlet (TAC) is not greater than a threshold temperature for the boosted air (TAC(ref)), the method returns to 410 to continue circulating coolant at ambient temperature through the HCAC with the EAP on.

The maximum allowable temperature of the coolant exiting the insert (TWF) may be a value stored in the controller that is a temperature threshold representing an air temperature, as estimated by inferred heat exchange from the coolant to the boosted air, above which the performance of the compressor may be affected. For example, air delivered to the engine when the coolant temperature is above the TWF may increase the likelihood of engine knock. Thus the subsequent activation of the chiller at 418 of the method may also be triggered by detection of the TWH at the TWF or within a threshold, e.g. 1-5° C. below the TWF. Alternatively, the temperature of the boosted air (TAC) may be measured at 416 and compared to the threshold temperature (TAC(ref)). Detection of the TAC may be based on information sent to the controller from a temperature sensor, such as the first temperature sensor 144 of FIG. 1, arranged in the path of air flow at an outlet end of the HCAC and upstream of the engine.

The threshold temperature of the boosted air (TAC(ref)) may be a temperature determined by the manufacturer to be an upper limit to the boosting efficiency of the compressed air. In one example, the TAC(ref) may be set so that the TAC exceeds the TAC(ref) before the TWH exceeds the TWF. Due to the higher heat capacity of fluids versus air, the TAC tends to increase faster than the TWH. If the activation of the chiller is dependent on when the TWH surpasses the TWF, the heat exchange between air and coolant may be inefficient, increasing the likelihood of engine knock. However, by configuring the method to detect rising of the TAC above the TAC(ref) before the TWH exceeding the TWF, the chiller may be activated earlier, generating a larger temperature differential between the air and coolant and thereby improving cooling performance.

The activation of the chiller may also occur if the TAC is at or within a threshold of the TAC(ref), e.g., 1-5° C. below the TAC(ref). The chiller may be turned on at 418, and at 420, additional cooling of the coolant is provided such that more heat may be extracted from the boosted air into the coolant flowing through the chiller circuit. At 422, the grille shutters of an AGS, such as the AGS 150 of FIG. 1, is maintained closed provided the TWH and/or TAC remain below the TWF and/or TAC(ref). However, if the TWH and TAC are not below the TWF and TAC(ref) or do not drop below the threshold of the TWF and TAC(ref) within a certain period of time, the grille shutters of the AGS may be opened.

At 424 of the method, it may be determined if the TWH is below (or below a threshold of) the TWF or if the TAC is below (or below a threshold of) the TAC(ref). If the temperatures of the coolant exiting the insert or the temperature of the boosted air has not decreased sufficiently, the method returns to 420 to continue circulating coolant through the activated chiller circuit. If the temperatures are sufficiently lowered, the method proceeds to turn the chiller at 426 and returns to 412 to determine if the TWH is lower than the TWH(ref).

Thus, in response to the coolant in the insert increasing to or above a second threshold temperature (e.g., the maximum allowable temperature), the chiller is activated to commence circulation of cooled coolant through the insert, and the charge air in the HCAC may be cooled via the ram air and via convection with the chilled, circulating coolant. Additionally or alternatively, the chiller may be activated in response to the charge air exiting the HCAC exceeding an air temperature threshold and opening of the AGS may be avoided.

Example operations of a chiller circuit coupled to a boosted air cooling path of an engine, with reference to the engine cooling loop of FIG. 1, are now discussed with reference to FIG. 5. Based on a desired amount of boost to be supplied to the engine and resultant compressor loads, the cooling of the boosted air may be adjusted between only air-to-air and both air-to-air and air-to-coolant heat exchange, with enhanced cooling of the air-to-coolant exchange through assistance from a chiller.

FIG. 5 shows an example operation timing diagram 500 of a chiller circuit and boosted air cooling path (such as the chiller circuit and boosted air cooling path illustrated in FIG. 1) adapted with an HCAC at a merging point of the chiller circuit and boosted air cooling path. The HCAC is configured to receive compressed air from a compressor of a turbocharger and supply cooled compressed air to an engine via the boosted air cooling path. As illustrated in diagram 500, compressor load is depicted at graph 502. A temperature of the boosted air (TAC) at an outlet end of the HCAC is shown at graph 504 and a temperature of the coolant (TWH) downstream of the HCAC and upstream of the chiller in the chiller circuit is shown at graph 506. The status of an EAP in the chiller circuit between off and on positions is illustrated at graph 508 and the status of the chiller is shown at graph 510.

Prior to t1, the engine is operating at low speed with the compressor spinning also at a low speed. Boosted air is cooled by air-to-air heat exchange at the HCAC through cross-flow of ambient air across a surface of the HCAC. The TAC is below a TAC(ref) 412 and the TWH is below both a TWH(ref) 514 and a TWF 516. The EAP and chiller are turned off. An increased demand for torque may be detected by a pedal position sensor, resulting in higher rate of fuel injection at the engine to match the supply of boosted air. More exhaust gas is thus generated, which is directed to a turbine of the turbocharger, driving a higher rate of spinning of the turbine as well as the compressor.

As the compressor load rises, the temperature of the boosted air may also rise. Heat from the boosted air may be transferred to the coolant in the chiller circuit and, at t1, the temperature increase may result in the TAC reaching the TAC(ref) 512 or within a threshold of the TAC(ref) 512, as described above. The TWH rises more gradually due to the higher heat capacity of the coolant compared to air. A controller, such as the controller 142 of FIG. 1, may send a command to turn on the EAP at t2. As the coolant circulates through the chiller circuit at ambient temperature, the temperature of the cooled, boosted air (TAC) may decrease after a period of time between t2 and t3. At t3, the TAC falls below the TAC(ref) and the chiller is turned off after a short delay.

Between t3 and t4, a second tip-in is detected and compressor load increases due to higher torque demand. Heat transfer by convection may not prevent the slow but continual rise in temperature of the TWH. At t4, the TWH crosses the maximum allowable temperature of the coolant exiting the insert (TWF) 516 while the TAC remains below the TAC(ref). The controller commands the chiller to be turned on in response to the TWH reaching the TWF 516 at t4. Circulation of the coolant through the active chiller may offset the temperature rise due to increased compressor loading. The heat extraction capacity of the coolant is enhanced, effectively drawing down the TWH over a period of time. The amount of time, e.g., duration between t4 and t5, may be based on a speed of coolant circulation, temperature differential between the set temperature of the chiller and the detected TWH, as well as efficiency of heat transfer from the coolant to the cooling components of the chiller.

At t5, the TWH is cooled to below the TWF 516. A command is sent to turn off the chiller after a short delay, while continuing to circulate coolant through the chiller circuit (e.g., the EAP remains on). During the period between t5 and t6, the torque demand may be reduced due to a slowing or stopping of the vehicle or the engine entering a cruising mode, for example. The TWH and the TAC decrease until, at t6, the TWH crosses the TWH(ref) 514. Detection of the TWH dropping below the TWH(ref) 514 results in the controller sending a signal to deactivate, e.g. turn off, the EAP after a brief delay period.

The controller may be optionally programmed to set the TWF 516 and the TAC(ref) 512 at lower temperatures during the cooling period (e.g., between t3 and t4) that determines when the chiller is turned off versus during the heating period (e.g., between t1 and t2) that determines when the chiller is turned on. By lowering the TWF 516 and TAC(ref) 512 during cooling of the coolant and boosted air subsequent to a tip-out, rapid activation and deactivation of the chiller is avoided. As well, threshold values may be configured by the manufacturer and control algorithms may be utilized to avoid rapid activation and deactivation of both the EAP and chiller in response to tip-out events.

In this way, a chiller-assisted HCAC may efficiently cool boosted air delivered to an engine. By adapting the HCAC with an insert through which coolant in a chiller circuit may flow, the HCAC may cool boosted air in stages, where a first stage is defined as air-to-air-cooling, a second stage is defined as air-to-air and coolant-to-air cooling, and a third stage is defined as air-to-air and chiller-assisted coolant-to-air cooling. The amount of energy used to power both an EAP for driving coolant flow and a chiller for lowering the temperature of the coolant to enhance cooling capacity may be minimized. Pre-set thresholds determine when the EAP and chiller are turned on and off so that unnecessary operation of the EAP and chiller during light compressor loads, when boosted air and coolant temperatures are still below thresholds, is avoided. The efficiency of the HCAC and the coupling of the chiller circuit to an already existing chiller in an electric or hybrid electric vehicle may allow configuration of HCACs with smaller dimensions than conventional ACACs and lower costs than WCACs, thereby liberating space in the front end of a vehicle in spite of the inclusion of a chiller. The technical effect of the coupling the chiller-assisted HCAC to the engine is that boosted engine performance is improved while maintaining fuel economy of a vehicle.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In one example, a method includes during first conditions, cooling charge air from a compressor via air-to-air conductive cooling and air-coolant conductive cooling at a hybrid charge air cooler (HCAC); during second conditions, cooling charge air from the compressor via the air-to-air conductive cooling and via air-to-coolant convective cooling at the HCAC; and during third conditions, cooling charge air from the compressor via the air-to-air conductive cooling and via chiller-assisted air-to-coolant convective cooling at the HCAC. In a first example of the method, cooling the charge air from the compressor via air-to-cooling at the HCAC comprises flowing the charge air through a plurality of heat exchange channels of the HCAC, the plurality of heat exchange channels each having at least one surface over which ram air is configured to flow during vehicle operation, wherein the first, second, and third conditions are non-overlapping and different from one another. A second example of the method optionally includes the first example and further includes wherein cooling charge air from the compressor via the air-to-air cooling and via the air-to-coolant cooling at the HCAC comprises flowing the charge air through the plurality of heat exchange channels and activating a coolant pump to circulate coolant through a cooling insert of the HCAC. A third example of the method optionally includes one or more of the first and second examples, and further includes, wherein activating the coolant pump to circulate coolant through the cooling insert of the HCAC comprises activating the coolant pump to circulate coolant through a plurality of cooling tubes of the cooling insert, each cooling tube positioned between respective two adjacent heat exchange channels of the plurality of heat exchange channels. A fourth example of the method optionally includes the first through third examples, and further includes, during the first conditions, maintaining the coolant pump in a deactivated state throughout the first conditions. A fifth example of the method optionally includes the first through fourth examples, and further includes, wherein cooling charge air from the compressor via the air-to-air cooling and via the chiller-assisted air-to-coolant cooling at the HCAC comprises activating a chiller to cool the coolant circulating through the cooling insert. A sixth example of the method optionally includes the first through fifth examples, and further includes, wherein the first conditions comprise vehicle operation with a temperature of coolant at an outlet of a cooling insert of the HCAC being less than a first threshold temperature, the second conditions comprise vehicle operation with the temperature of coolant at the outlet of the cooling insert being equal to or greater than the first threshold temperature but less than a second threshold temperature, and wherein the third conditions comprise vehicle operation with the temperature of coolant at the outlet of the cooling insert being equal to or greater than the second threshold temperature, the method including operating at each of the conditions sequentially and/or non-sequentially.

In another example, a system includes a hybrid charge air cooler (HCAC) coupled in an intake air passage downstream of a compressor and upstream of an engine, the HCAC comprising an air-to-air heat exchanger including plurality of heat exchange channels configured to flow compressed charge air from the compressor and a cooling insert coupled to the air-to-air heat exchanger; and a chiller circuit including a pump, a chiller, and a coolant passage coupled to the cooling insert, the chiller circuit configured to supply coolant to the cooling insert. In a first example of the system, the cooling insert comprises a plurality of cooling tubes, an inlet coupling to an upstream end of the coolant passage to the plurality of cooling tubes, and an outlet coupling the plurality of cooling tubes to a downstream end of the coolant passage. A second example of the system optionally includes the first example and further includes wherein the plurality of heat exchange channels are vertically stacked with a respective gap separating adjacent heat exchange channels, each respective gap configured to flow ram air across a front and a bottom surface of the heat exchange channels. A third example of the system optionally includes one or more of the first and second examples, and further includes, wherein each respective cooling tube of the plurality of cooling tubes is positioned in a respective gap, in contact with one of the heat exchange channels arranged below, and spaced away from one of the heat exchange channels arranged above the cooling tube. A fourth example of the system optionally includes one or more of the first through third examples, and further includes, wherein each respective cooling tube shares a surface with a respective one of the heat exchange channels arranged below the cooling tube. A fifth example of the system optionally includes one or more of the first through fourth examples, and further includes, further comprising a controller storing non-transitory instructions executable to activate the pump responsive to a temperature of the coolant at an outlet of the cooling insert being greater than a first threshold temperature. A sixth example of the system optionally includes one or more of the first through fifth examples, and further includes, wherein the instructions are executable to activate the chiller responsive to the temperature of the coolant at the outlet of the cooling insert being greater than a second threshold temperature, higher than the first threshold temperature. A seventh example of the system optionally includes one or more of the first through sixth examples, and further includes, wherein the instructions are executable to activate the chiller responsive to the temperature of the charge air at the outlet of the HCAC being greater than a third threshold temperature. An eighth example of the system optionally includes one or more of the first through seventh examples, and further includes, wherein the instructions are executable to maintain the pump activated and the chiller deactivated when the temperature of the coolant at the outlet of the cooling insert being between the first threshold temperature and second threshold temperature.

In another example, a method includes flowing compressed charge air through a plurality of heat exchange channels of a hybrid charge air cooler (HCAC) and to an engine; responsive to a temperature of coolant at an outlet of a cooling insert of the HCAC reaching a first threshold temperature, activating a pump to circulate the coolant through the cooling insert; and responsive to the temperature of the coolant at the outlet of the cooling insert reaching a second threshold temperature, higher than the first threshold temperature, and/or responsive to a temperature of charge air at an outlet of the HCAC reaching a third threshold temperature, activating a chiller coupled in series with the cooling insert to cool the coolant circulating through the cooling insert. In a first example of the method, the temperature of the coolant is sensed via a temperature sensor coupled to the coolant. A second example of the method optionally includes the first example and further includes wherein the charge air temperature is sensed via a temperature sensor coupled to an outlet of the HCAC, and wherein the third threshold temperature is adapted to be surpassed prior to the temperature of the coolant reaching the second threshold temperature. A third example of the method optionally includes one or more of the first and second examples, and further includes wherein the method further comprises operating the engine during selective driving conditions of a vehicle having the engine, and otherwise driving the vehicle via an electric motor while the engine is deactivated.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during first conditions, cooling charge air from a compressor via air-to-air conductive cooling and air-coolant conductive cooling at a hybrid charge air cooler (HCAC);
during second conditions, cooling charge air from the compressor via the air-to-air conductive cooling and via air-to-coolant convective cooling at the HCAC; and
during third conditions, cooling charge air from the compressor via the air-to-air conductive cooling and via chiller-assisted air-to-coolant convective cooling at the HCAC, wherein cooling tubes respectively containing the cooling charge air, air-to-coolant coolant, and chiller-assisted air-to-coolant coolant are vertically stacked within the HCAC via an insert positioned within the HCAC, with tubes for the chiller-assisted air-to-coolant coolant vertically between pairs of cooling tubes containing the cooling charge air and the air-to-coolant coolant.

2. The method of claim 1, wherein cooling the charge air from the compressor via air-to-air conductive cooling at the HCAC comprises flowing the charge air through a plurality of heat exchange channels of the HCAC, the plurality of heat exchange channels each having at least one surface over which ram air is configured to flow during vehicle operation, wherein the first, second, and third conditions are non-overlapping and different from one another.

3. The method of claim 2, wherein cooling charge air from the compressor via the air-to-air conductive cooling and via the air-to-coolant convective cooling at the HCAC comprises flowing the charge air through the plurality of heat exchange channels and activating a coolant pump to circulate coolant through the insert of the HCAC.

4. The method of claim 3, wherein activating the coolant pump to circulate coolant through the insert of the HCAC comprises activating the coolant pump to circulate coolant through a plurality of the cooling tubes of the insert, each cooling tube positioned between respective two adjacent heat exchange channels of the plurality of heat exchange channels.

5. The method of claim 4, further comprising, during the first conditions, maintaining the coolant pump in a deactivated state throughout the first conditions.

6. The method of claim 3, wherein cooling charge air from the compressor via the air-to-air conductive cooling and via the chiller-assisted air-to-coolant convective cooling at the HCAC comprises activating a chiller to cool the coolant circulating through the insert of the HCAC.

7. The method of claim 1, wherein the first conditions comprise vehicle operation with a temperature of coolant at an outlet of the insert of the HCAC being less than a first threshold temperature, wherein the second conditions comprise vehicle operation with the temperature of coolant at the outlet of the insert of the HCAC being equal to or greater than the first threshold temperature but less than a second threshold temperature, and wherein the third conditions comprise vehicle operation with the temperature of coolant at the outlet of the insert of the HCAC being equal to or greater than the second threshold temperature, the method including operating at each of the conditions sequentially and/or non-sequentially.

8. The method of claim 1, further comprising adjusting grille shutters positioned in front of the HCAC with the insert.

\* \* \* \* \*